(12) United States Patent
Hwang et al.

(10) Patent No.: US 9,645,349 B1
(45) Date of Patent: May 9, 2017

(54) COMPACT MOUNTING FOR LOCAL OSCILLATOR LASER LAUNCH

(71) Applicant: LOCKHEED MARTIN COHERENT TECHNOLOGIES, INC., Louisville, CO (US)

(72) Inventors: David Hwang, Louisville, CO (US); Jesse William Fisher, Boulder, CO (US)

(73) Assignee: LOCKHEED MARTIN COHERENT TECHNOLOGIES, INC., Louisville, CO (US)

( * ) Notice: Subject to any disclaimer, the term of this patent is extended or adjusted under 35 U.S.C. 154(b) by 26 days.

(21) Appl. No.: 14/934,055

(22) Filed: Nov. 5, 2015

Related U.S. Application Data

(62) Division of application No. 14/155,208, filed on Jan. 14, 2014, now Pat. No. 9,207,322.

(60) Provisional application No. 61/759,984, filed on Feb. 1, 2013.

(51) Int. Cl.
*G02B 7/02* (2006.01)

(52) U.S. Cl.
CPC .................. *G02B 7/026* (2013.01)

(58) Field of Classification Search
CPC ...................................... G02B 7/023
USPC .................................. 359/818, 819
See application file for complete search history.

(56) References Cited

U.S. PATENT DOCUMENTS

| | | | |
|---|---|---|---|
| 6,170,795 B1 | 1/2001 | Wayne | |
| 6,317,278 B1* | 11/2001 | Metsala | G02B 7/004 359/813 |
| 9,207,322 B1 | 12/2015 | Hwang et al. | |
| 2013/0242099 A1 | 9/2013 | Sauer et al. | |

* cited by examiner

*Primary Examiner* — James Jones
(74) *Attorney, Agent, or Firm* — McDermott Will & Emery LLP

(57) ABSTRACT

A compact LIDAR pointing assembly can comprise a body, first and second ferrules, and a clip component that can be used to maintain an engagement between the first and second ferrules and an alignment of light emanating from the first and second ferrules relative to received light propagating along an optical axis of the assembly. The ferrules can be pivoted to adjust the orientation of the light emanating from the ferrules.

5 Claims, 6 Drawing Sheets

COMPACT MOUNTING FOR LOCAL OSCILLATOR LASER LAUNCH

CROSS-REFERENCE TO RELATED APPLICATIONS

This application is a divisional of U.S. patent application Ser. No. 14/155,208, filed on Jan. 14, 2014, which claims the priority benefit of U.S. Patent Application No. 61/759,984, filed on Feb. 1, 2013, the entirety of each of which is incorporated herein by reference.

STATEMENT REGARDING FEDERALLY SPONSORED RESEARCH OR DEVELOPMENT

These inventions were made with government support under Contract Number FA8650-10-C-7040 awarded by the Air Force Research Laboratory. The government has certain rights in the inventions.

FIELD OF THE INVENTIONS

The present inventions generally relate to LIght Detection And Ranging (LIDAR) systems and, in particular, to mounting of local oscillator (LO) laser light with the light reflected from the target.

BACKGROUND

LIDAR is an optical remote sensing technology that can measure the distance to or other properties of targets by illuminating the target with laser light and analyzing the reflected light.

For coherent LIDAR applications, LO laser light must be mixed with the diffuse laser light that is reflected by the remote target. A portion of the laser light produced by the LIDAR system transmitter is diverted and simultaneously projected onto a focal plane array (FPA) along with the reflected light. For many coherent LIDAR applications, the transmit laser light is fiber-based and launched into free space for transmission to the target. Therefore, the sampled LO light is also fiber-based.

SUMMARY

Various technological barriers exist in developing systems for new coherent LIDAR applications or uses. For example, optical sensitivities, mechanical implementation or sizing, coatings, and cost barriers may present challenges in developing a LIDAR system for a new application. Some embodiments disclosed herein address the challenges presented in free space laser light location requirements. In particular, some embodiments disclosed herein solve one set of difficult requirements of launching fiber-based laser light into free space while allowing degrees of freedom in order to point this laser light in a desired direction and also allow for a very close proximity clear aperture for received light to pass by.

In coherent LIDAR applications, local oscillator (LO) laser light must be mixed with diffuse laser light reflecting off of a target located at a remote distance. Initially, light can be transmitted from a transmitter of the coherent LIDAR system ("transmit light") to be reflected off of the target. The LO light can be a small sample of the transmit light. When the transmit light is reflected off of the target and received by the LIDAR system ("received light"), it can be mixed with the LO light and both can be simultaneously projected onto a focal plane array (FPA). When the LO light and the received light are simultaneously projected onto the FPA, they are considered to be "mixed." Some embodiments disclosed herein provide a system and method for mixing LO light with the small amount of received light reflected off the target at a remote range.

For many coherent LIDAR applications, the transmit laser light is fiber-based and launched into free space for transmission to the target. Therefore, the sampled LO light is also fiber-based. Likewise, the LO light must be launched into free space so that it can be mixed with the free space return light.

In accordance with some embodiments, coherent LIDAR systems are provided that comprise a launch assembly for controlling and adjusting the LO light orientation. The launch assembly for launching the LO light from fiber to free space serves the purpose of ensuring the proper function and effect of the coherent LIDAR system.

For example, some embodiments of a launch assembly are provided in which the LO light can be launched radially within less than 3 mm, less than 2 mm, less than 1 mm, or about 0.5 mm of the pupil plane for the received light. In such embodiments, an image of the received light at the pupil plane can have a spot diameter of 18 mm. Accordingly, the launch assembly can be configured not to impede the 18 mm diameter of received light while still providing two degrees of freedom of movement. Such embodiments can permit the adjustment and alignment of the LO light so that the LO light is pointed in the correct direction to be mixed with the received light.

Additionally, in accordance with some embodiments, an end of a LO fiber ferrule from which the LO light is launched can be located in a substantially the same plane as the receive 18 mm diameter pupil. Further, according to some embodiments, the launch assembly can be adjustable. Furthermore, the adjustable assembly can be configured to fit into a height or thickness of less than 17 mm (in the direction of light propagation). In some embodiments, the assembly can be configured to fit into a height or thickness of less than 13 mm (in the direction of light propagation). Further, in some embodiments, the assembly can be configured to fit into a height or thickness of less than 10 mm (in the direction of light propagation). In some embodiments, the assembly can be configured to fit into a height or thickness of about 7 mm (in the direction of light propagation). Such embodiments can advantageously satisfy demanding mechanical or size constraints of the receive optics needed for image formation.

In some embodiments, the launch assembly can be lockable to maintain a desired alignment of the LO fiber ferrule in order to withstand the thermal and dynamic inputs to the system in its usage environment.

Further, in accordance with some embodiments, the launch assembly can be configured such that an end of the LO fiber ferrule is spaced at a radial distance of less than 1 mm, and in some embodiments, less than 0.5 mm away from the received light path. In such embodiments, the LO fiber ferrule can also be positioned adjacent to or in the pupil plane with the received light, while not blocking any received light and still providing two degrees of freedom of movement of the LO fiber ferrule. As such, embodiments of the launch assembly disclosed herein can fit into a very limited space.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the inventions as claimed.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

The following description discloses embodiments of a LIDAR system that can comprise an ultra-compact launch, pointing, or pupil plane assembly. In certain embodiments, the assembly allows the emitted LO laser beam to be positioned very close to the reflected light beam within the LIDAR system, thus enabling the assembly to be more compact for certain applications. Further, in some embodiments, the LO laser beam emitter(s) can be precisely aligned using precision alignment tools and then locked in place.

Figure 1:
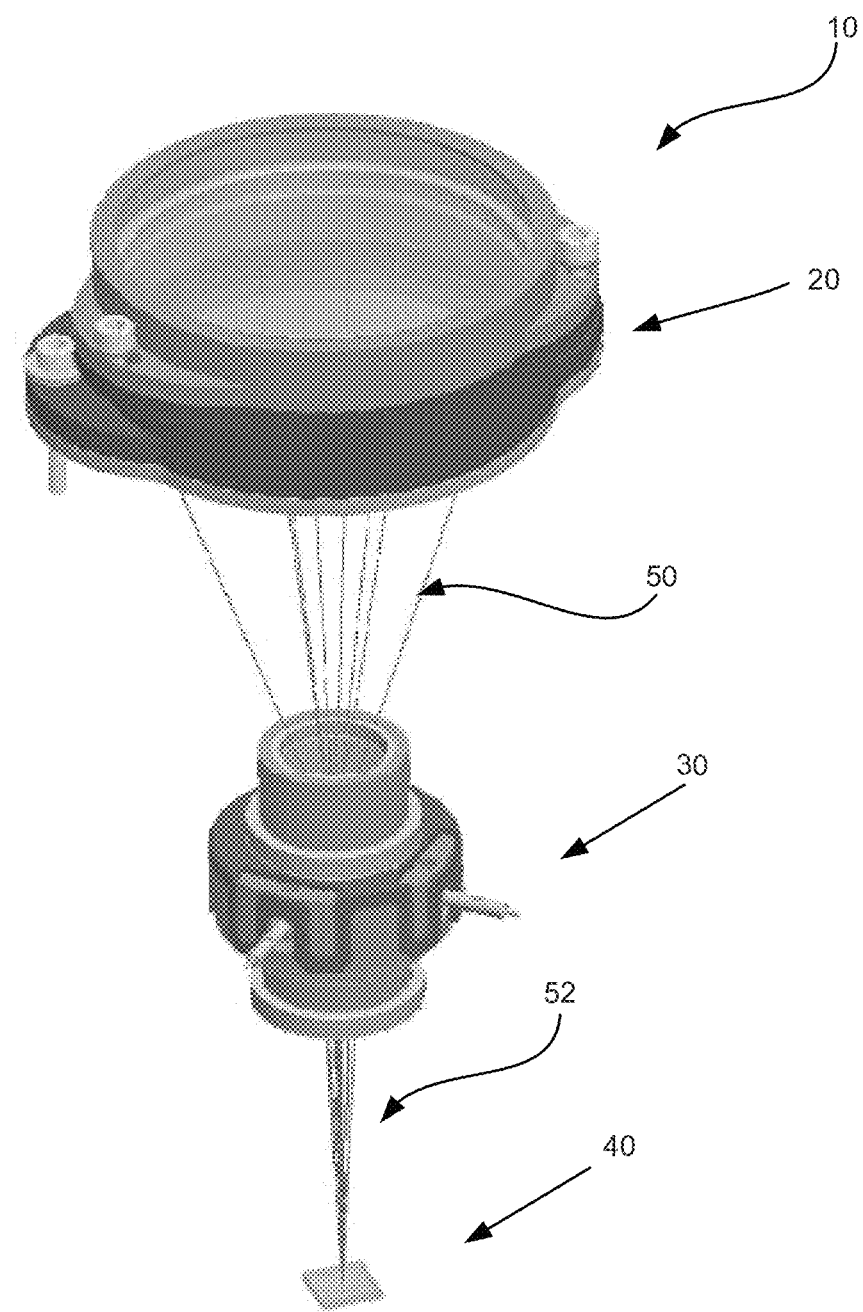
FIG. 1 is a perspective view of a portion of a LIDAR system, according to some embodiments.

Referring to the figures, embodiments of a coherent LIDAR system and a launch assembly, for use in a coherent LIDAR system, are shown. FIG. 1 illustrates a LIDAR system 10. The LIDAR system 10 can comprise a telescope lens assembly 20, a launch assembly 30, and a focal plane array 40. According to some embodiments, the LIDAR system 10 can comprise at least one, and in some embodiments, several launch assemblies 30.

Figure 2:
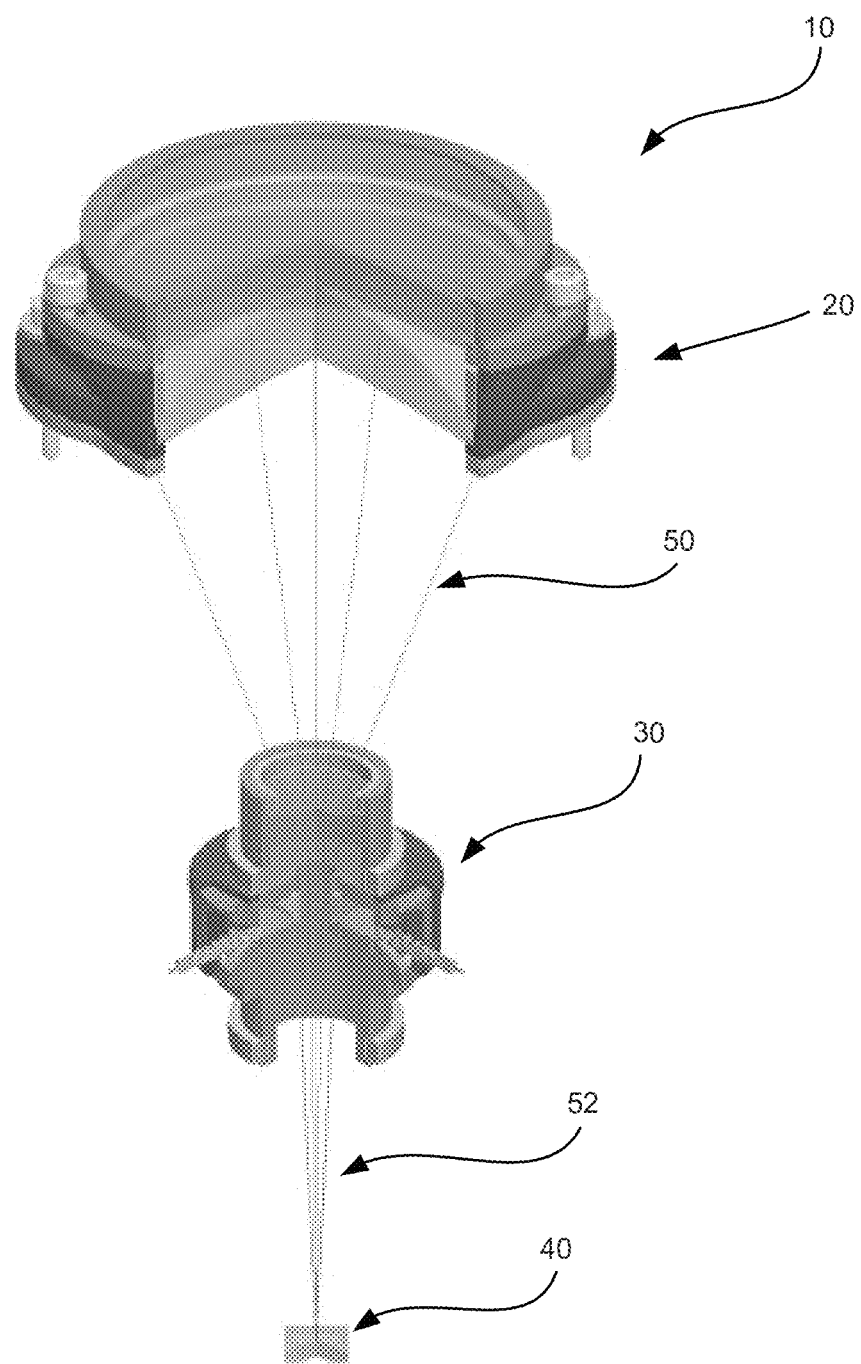
FIG. 2 is a cut-away view of the system of FIG. 1 system, according to some embodiments.

As illustrated in FIGS. 1 and 2, the LIDAR system 10 can be aligned such that the telescope lens assembly 20 directs and converges light toward the launch assembly 30. The launch assembly 30 can receive the light 50, which can be received light or diffuse light reflected off of a target. The launch assembly 30 can direct LO light from at least one LO source onto the focal plane array 40 such that the received light and the LO light (collectively, element 52) are simultaneously projected onto the focal plane array 40.

In accordance with an aspect of some embodiments disclosed herein, the focal plane array 40 can be spaced from the launch assembly 30 at a distance that is substantially less than that required by traditional systems, which can be between about 3 feet and 6 feet. For example, the focal plane array 40 can be spaced at a distance less than 30%, less than 20%, or less than 10% of the distance of traditional systems, which can be a distance of between about 4 inches to about 2 feet.

Accordingly, some embodiments can be configured such that the launch assembly 30 is an ultra-compact or ultra-thin assembly, as measured in the direction of light propagation. A thinner assembly allows more flexibility in receive optics designs that require compact mounting of optics for imaging LIDAR applications. As discussed further below, the arrangement and placement of components of the launch assembly 30 enable the assembly 30 to be highly compact.

Figure 3:
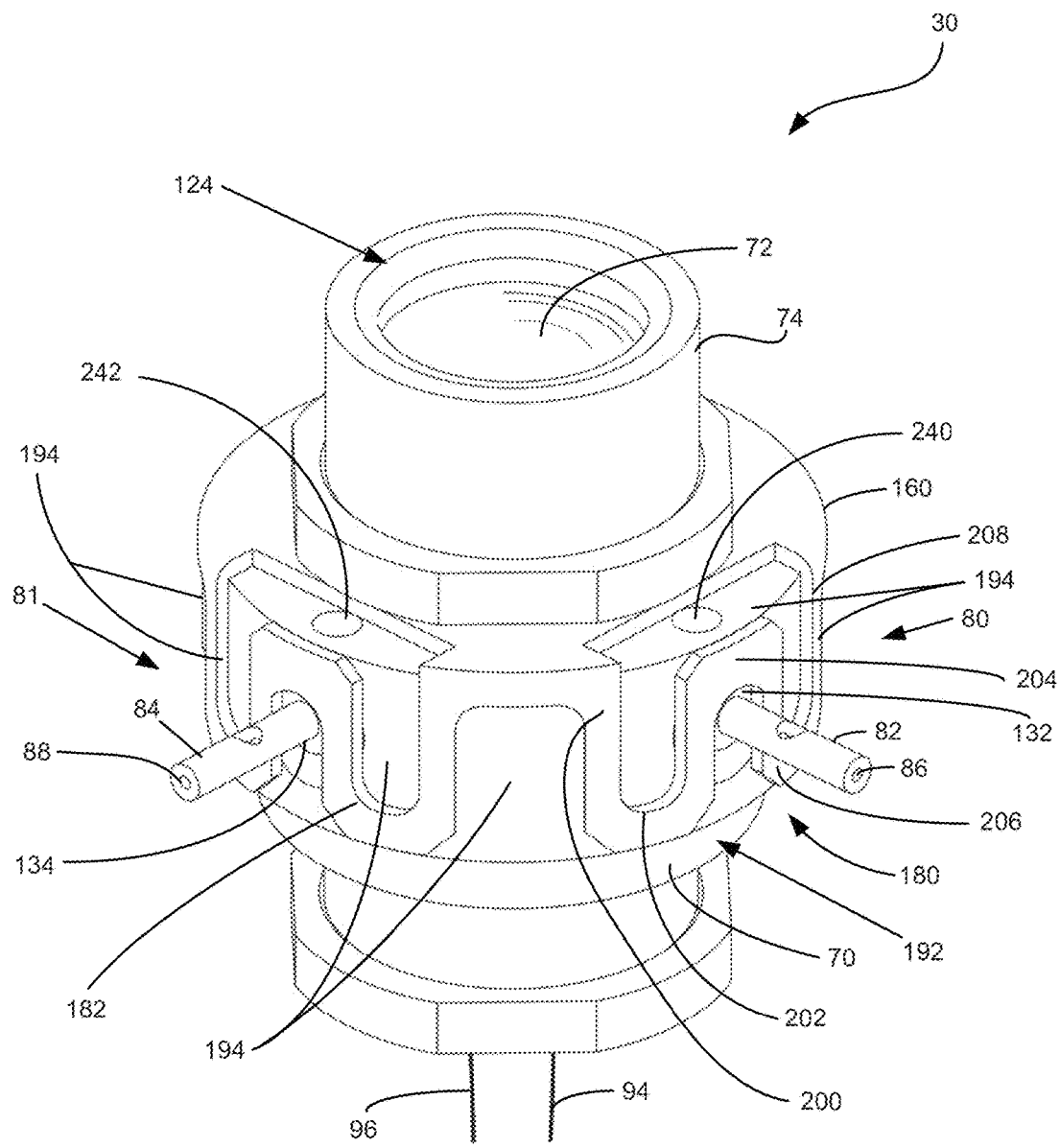
FIG. 3 is a perspective view of a launch assembly, according to some embodiments.
Figure 4:
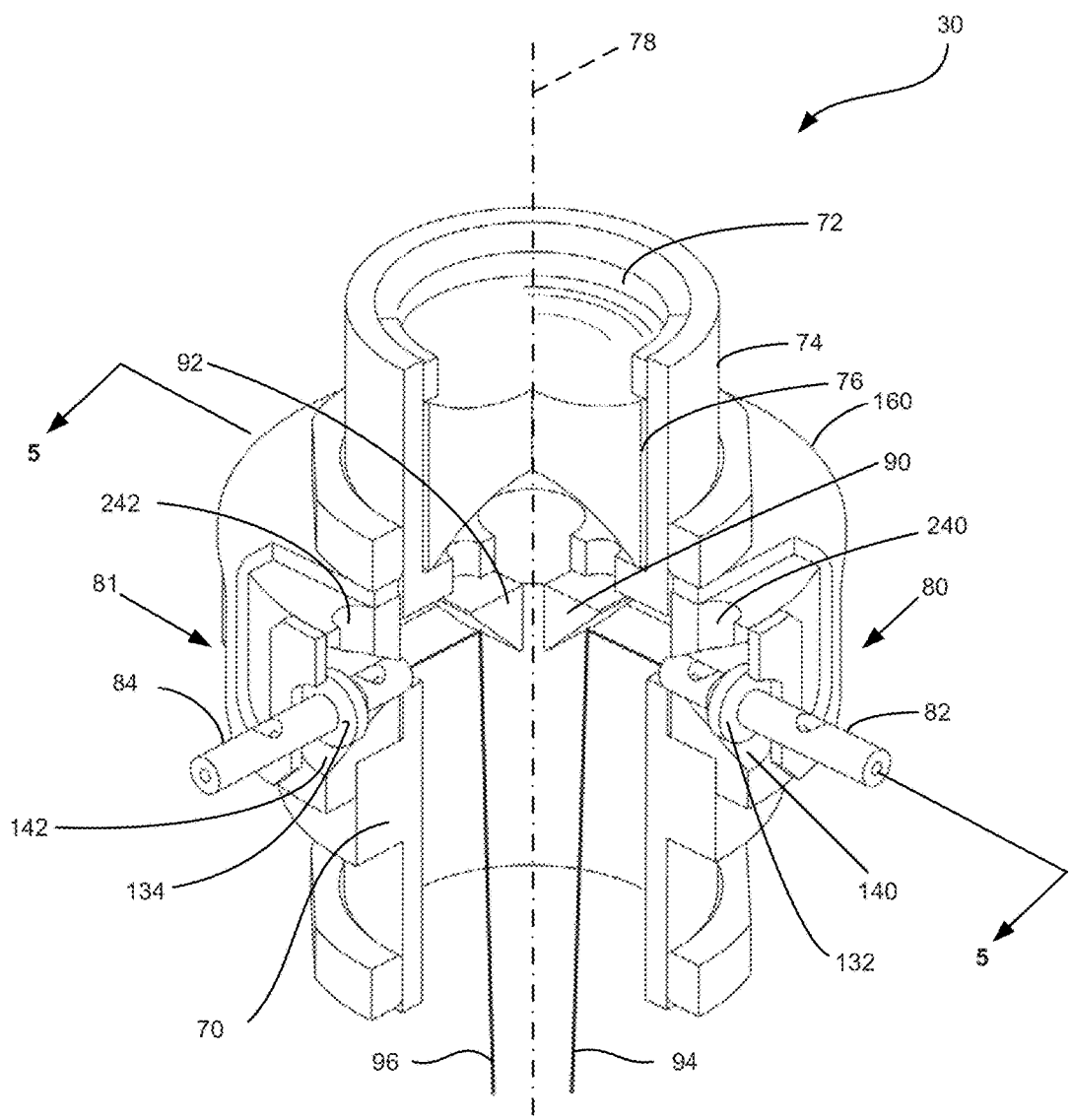
FIG. 4 is a cut-away view of the launch assembly of FIG. 3, according to some embodiments.
Figure 5:
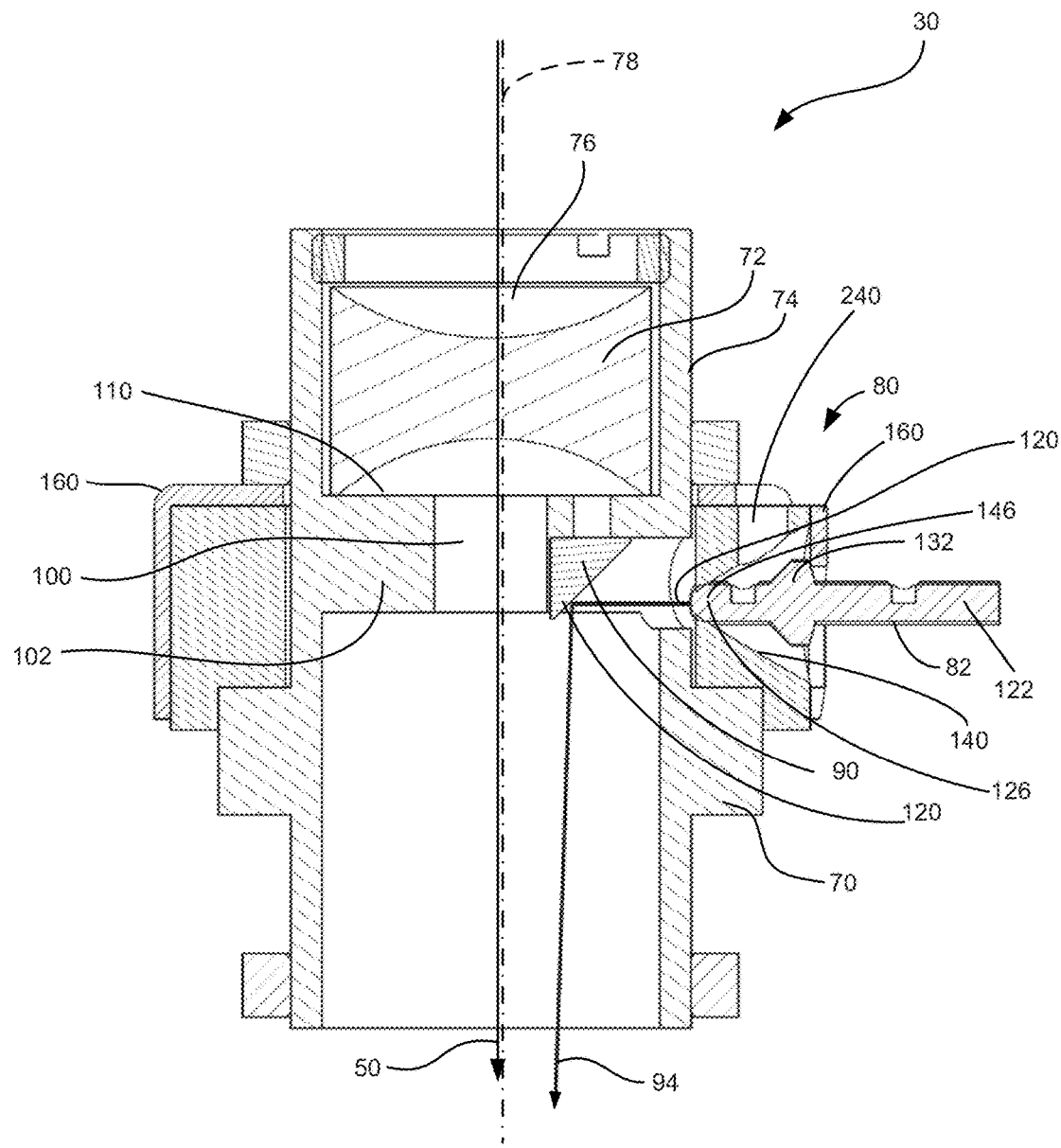
FIG. 5 is a side view of the launch assembly of FIG. 3, according to some embodiments.

FIGS. 3-5 illustrate an embodiment of the launch assembly 30. The launch assembly 30 can comprise a body 70 and a telescoping lens 72 coupled to the body 70 at a first end 74 thereof and inside a lumen 76 of the body 70. The body 70 can define a central axis 78 along which an optical axis of the lens 72 can be aligned. The lens 72 can have a diameter of less than 25 mm, less than 22 mm, or less than 20 mm. The launch assembly 30 can also comprise a ferrule assembly 80, 81 coupled to the body 70. The ferrule assembly 80, 81 can comprise at least one fiber ferrule 82, 84. The ferrule assembly 80, 81 can direct LO light in a direction perpendicular relative to a central axis 78 of the assembly 30.

For example, the fiber ferrule 82, 84 can be coupled relative to the body 70 such that the ferrules 82, 84 propagate LO light in a direction perpendicular relative to the central axis 78 of the assembly 30. Further, in some embodiments, the ferrules 82, 84 can propagate LO light in directions that are generally perpendicular relative to each other and perpendicular relative to the central axis 78. As illustrated, the fiber ferrules 82, 84 can manage or maintain the fibers out of the received light path and external to the receive optics of the assembly 30. Thus, performance of the focal plane array can be improved because no received light will be blocked by fiber ferrules 82, 84 or fiber routing parts.

The LO light can arrive to the LO launch assembly 30 via a fiber optic. In some embodiments, the end of the fiber optic can comprise the ferrule assembly 80, 81. The ferrule assembly 80, 81 can comprise at least one fiber ferrule 82, 84, which can comprise a numerical aperture (NA) reducer collimator. For example, the fiber ferrule 82, 84 or NA reducer collimator can comprise a steel tube housing a lens that controls the beam's divergence as it leaves the fiber and enters free space. The NA reducer collimator can be between about 0.250 mm and about 0.750 mm, between about 0.300 mm and about 0.500 mm, and in some embodiments, about 0.310 mm in diameter.

In some embodiments, in order to enable the launch assembly to be ultra-compact, the launch assembly 30 can be configured such that the LO light comprises a LO launch plane and position that appear as if it is actually inside another optic in the system.

For example, the LO light can be transmitted to the launch assembly 30 through the fiber ferrules 82, 84. Further, as shown in FIG. 4, the fiber ferrules 82, 84 can be coupled relative to the body 70 in order to direct LO light from a fiber 86, 88 toward a mirror component 90, 92 disposed within the body 70. As illustrated in the launch assembly 30, two ferrule assemblies 80, 81 can be used to provide two LO light beams per receive aperture (or per focal plane array).

The LO light reflected off of the mirror component 90, 92 is illustrated as lines 94, 96 in FIGS. 3-5. The reflected LO light 94, 96 is directed toward the focal plane array, as illustrated by elements 40 and 52 of FIGS. 1 and 2.

As illustrated in FIGS. 4-5, the launch assembly 30 can also comprise a pupil 100 through which received light 50 can pass. The pupil 100 can have a diameter of less than 15 mm, less than 10 mm, and in some embodiments, less than 5 mm. Further, the pupil 100 can be formed as an aperture extending coaxially within a pupil structure 102 of the body 70. The pupil structure 102 can comprise an upper surface or pupil plane 110.

In order to make the launch assembly 30 ultra-compact, the launch plane and launch position of the LO light can be adjacent to or substantially coextensive with the aperture or pupil 100 of the assembly 30. For example, in the embodiment illustrated in FIGS. 4-5, the ferrule assemblies 80, 81 and the body 70 can be configured such that the fiber ferrules 82, 84, from which LO light originates, are positioned adjacent to the pupil plane 110. This LO launch position, i.e., the position from which the LO light originates (e.g., the collimator exit or distal tip 120 of the fiber ferrule 82, 84) is shown in FIG. 5.

In some embodiments, from the perspective of the focal plane array (or camera), the LO light can appear to originate within the telescope lens 72 at the pupil plane 110. First, in some embodiments, the LO launch points can be radially adjacent to the image pupil 100 that increasing the radial LO launch points to outside the outer diameter of the telescope lens may not be desired. For example, the LO launch points can be defined as the position along the mirror component at which the LO light is reflected. Thus, the launch point of the LO light can be radially adjacent to the outer diameter of the image pupil 100. In some embodiments, the launch points of the LO light can be less than 3 mm, less than 2 mm, or less than 1 mm from the circumference or outer diameter of the image pupil 100. Additionally, in some embodiments, the LO light can appear to (e.g., to the focal plane array) or actually originate inside or immediately below a receive telescope optic (lens). This LO launch position and the receive lens can be positioned immediately adjacent to each other or in the same position. For example, the LO launch position can be adjacent to or immediately below the pupil plane and the receive lens can be immediately above the pupil plane.

Additionally, because of the resolution requirements of system 10, a sparse aperture array of assemblies 30 may be necessary (e.g., one LO launch assembly 30 pair per receive cell). The array spacing can be configured such that the entire LO launch light delivery, mounting, adjustment, and locking fits within a compact space. For example, the assembly 30 can be configured to define a height (as measured along its longitudinal axis 78) of between about 5 mm and about 15 mm, between about 6 mm and about 12 mm, between about 7 mm and about 9 mm, and in some embodiments, about 7 mm. Further, the assembly can 30 also be configured to define a cross-sectional width or dimension of between about 20 mm and about 70 mm, between about 30 mm and about 60 mm, between about 40 mm and about 50 mm, and in some embodiments, within about a 25 mm radial space.

The longitudinal position along the axis 78 of the LO launch is important within this 7 mm. Thus, in some embodiments, the longitudinal position along the axis 78 of the LO launch can be in substantially the same plane as a receive telescope lens, and occupy the same space as the LO launch plane (pupil plane).

In accordance with some embodiments, in order to allow or enable the LO launch to originate in substantially the same plane as the telescope lens (and occupy substantially the same space as the lens 72), the mirror components 90, 92 can be placed in front of (in the direction of light propagation, such along the axis 78) the telescope lens. The mirror components 90, 92 can comprise a 2 mm wide and 2 mm tall mirror that is oriented at a 45 degree angle relative to the axis 78. The mirror components 90, 92 can be bonded to the body 70, to which the lens 72 is also coupled. As shown in FIGS. 4-5, the fiber ferrules 82, 84 can be positioned adjacent to the mirror components 90, 92. The fiber ferrules 82, 84 can extend radially with respect to the axis 78 such that the LO light is traveling perpendicular and toward the axis 78 which is the received-light path.

In such an embodiment, as the radial LO light bounces off the 45 degree mirror 90, 92 at the exit of the ferrules 82, 84 to fold the LO laser light approximately 90 degrees and in the direction 78 of the received-light propagation direction such that the received light and LO light intersect each other at the focal plane array plane 40. Using this radial LO launch and 45 degree fold mirror arrangement allows the LO light to appear to the focal plane array (camera) as if the LO were originating within the telescope lens at the pupil plane.

In accordance with some embodiments, mechanical and optical tolerances of the position of the fiber ferrules 82, 84 and the mirror components 90, 92, in combination with available LO laser power and optical requirements, are such that the LO light propagating toward the focal plane array 40 may need to be adjustable in the pointing direction so that enough LO light will properly hit the focal plane array 40 and mix with the signal return light.

The fiber ferrules 82, 84 can be between about 0.5 mm and about 2 mm, between about 0.8 mm and about 1.5 mm, and in some embodiments, about 1 mm in diameter. Further, the fiber ferrules 82, 84 can also be configured to be adjustable.

The ferrules 82, 84 can comprise a rounded member that can engage with at least a portion of an engagement structure of the body 70. For example, the ferrules 82, 84 can each comprise a rounded distal tip portion 126 or one or more skirt or mating components that can be configured to engage with corresponding engagement structures of the body 70 of the assembly 30.

In the embodiment illustrated in FIGS. 3-5, the body 70 can comprise an engagement structure 140, 142. The engagement structure 140, 142 can comprise a socket or indentation in the body 70. The socket can comprise a conical shape, but can also be formed to comprise other rounded or flat shapes. In some embodiments, the socket can comprise a surface that is configured to contact at least a portion of the ferrules 82, 84. For example, the socket can contact a distal tip, a midsection, or a proximal section of the ferrules 82, 84.

In the illustrated embodiment of FIG. 5, a tip portion 126 of the fiber ferrule 82 (i.e., the end near the collimator exit) can have a rounded, tapered, or ogive shape. The engagement structure 140 can comprise a narrowed section 146 that is smaller than the maximum radial dimension of the tip portion 126 of the ferrule 82. The tip portion 126 can be positioned against or urged into contact with the narrowed section 146 of the engagement structure 140. Further, because of the rounded, smooth interface, the ferrule 82 can pivot about the contact point between the tip portion 126 and the narrowed section 146.

Some embodiments can also be configured that the skirt or mating components of the ferrules 82, 84 are used to constrain the tip portion 126 in contact with the narrowed section 146. For example, the assembly 30 can comprise a clip component that engages the skirt or mating components of the ferrules 82, 84 such that the tip portion 126 is forced into contact with the narrowed section 146. As shown in FIG. 5, a first, proximal, or radially outer surface of the skirt or mating component 132 can be contacted by a clip component 160 in order to press or urge the tip portion 126 into contact with the narrowed section 146.

However, in some embodiments, the engagement structure 140, 142 can be configured such that a surface of the engagement structure 140, 42 is in contact with a second, distal, or radially inner surface of the skirt or mating component 132 and the tip portion 126 can be unconstrained or not in contact with any portion of the engagement structure 140, 142. In such an embodiment, in contrast to the embodiment illustrated in FIG. 5, where the pivot point between the ferrule 82, 84 and the engagement structure 140, 142 is located substantially at the tip portion 126, the pivot point can also be located substantially at the skirt or mating component 132.

In either embodiment, the skirt or mating components 132, 134 can comprise a rounded shape that fits into a corresponding engagement structure 140, 142 of the body 70. For example, the skirt or mating components 132, 134 can comprise a generally rounded, annular shape, and the engagement structure 140, 142 can comprise a substantially cone-shaped hole in the body 70. Further, the skirt or mating components 132, 134 of the fiber ferrules 82, 84 can be positioned approximately ½ to about ⅓ of the way down (from either end) the ferrules 82, 84. As illustrated, the skirt or mating components 132, 134 can comprise a larger outer diameter than the rest of the ferrule (which can be substantially cylindrical).

The ferrule tip portion 126 and a cone-hole arrangement or engagement structure 140 can therefore approximate a ball-and-socket joint. This ball-and-socket joint allows the collimator or ferrule 82, 84 to tip and/or tilt in a plane perpendicular to the collimator or ferrule axis, allowing two degrees of freedom in LO light pointing adjustment. For this application, there are two fiber ferrules 82, 84 and two ball-and-socket assemblies per receive aperture or assembly 30.

Referring again to FIGS. 3-5, the assembly 30 can also comprise a clip component 160. The clip component 160 can be positioned about the body 70 in order to secure at least a portion of the ferrules 82, 84 relative to the body 70. For example, the clip component 160 can secure the ferrules 82, 84 within the engagement structures 140, 142 of the body 70 in an engaged position.

According to some embodiments, the clip component 160 can comprise at least one radial spring configured to contact a portion (e.g., the skirt 132, 134) of at least one ferrule 82, 84. As illustrated in FIG. 3, the clip component 160 can comprise two radial springs 180, 182. For example, the clip component 160 can comprise a substantially cylindrical body and the radial spring 180, 182 can comprise at least one deflectable, flexible or resilient member 192 of the cylindrical body.

The radial spring 180, 182 can be coupled to or cut or etched from the cylindrical body. The radial spring 180, 182 can be formed separately from the cylindrical body and coupled thereto as a flexible or resilient section. However, the radial spring 180, 182 can also be formed unitarily with the cylindrical body as a single, continuous piece of material which can be etched to create be flexible or resilient section. Thus, in some embodiments, the cylindrical body can be cut or etched using a laser to create voids in the cylindrical body that allow a portion of the cylindrical body to be deflectable in order to provide a biasing force that can maintain or urge the ferrule 82, 84 into an engaged position with the body 70 of the assembly 30. The radial spring 180, 182 can comprise at least one etched section 194 and the at least one radially deflectable member 192.

For example, the deflectable member 192 can be a free corner or end of the cylindrical body that can deflect radially with respect to other sections of the clip component 160. The deflectable member 192 can comprise a U-shaped member, S-shaped member, or hoop-shaped leaf spring coupled to the clip component 160. The deflectable member 192 can comprise a strip of material having one or more turns that is coupled to the cylindrical body. As illustrated in FIG. 3, the deflectable member 192 can be a strip of material that is coupled to the cylindrical body at a first end 200, extending along a circumference of the cylindrical body and having a first turn 202, a second turn 204, a third turn 206, and a second end 208 that is coupled to the cylindrical body. The second turn 204 can be U-shaped such that a fiber ferrule 82 can be received between lengths of the deflectable member 192.

Accordingly, the radial spring 180, 182 can fit over the body 70 of the assembly 30 to radially enclose or surround at least a portion of the body 70. The deflectable member 192 can be placed into contact with at least a portion of the ferrule 82, 84 such that the ferrule 82, 84 is radially biased into a seated or engaged position against the body 70. For example, as shown in FIG. 3, the radial spring 180, 182 can be positioned radially over the two assemblies of the ferrules 82, 84 to maintain the ferrules 82, 84 seated against the engagement structures 140, 142 of the body 70. For example, as shown FIGS. 3 and 5, the radial spring 180, 182 of the clip 160 can contact the skirt 132 of the ferrule 82 to push the ferrule 82 into the engagement structure 140 or cone hole of the body 70.

When engaged or seated against the engagement structures 140, 142, the ferrules 82, 84 can be adjustable relative to the body 70. For example, the engagement between the structures 140, 142 and the ferrules 82, 84 can act as a ball-and-socket movable joint that allows the longitudinal axes of the ferrules 82, 84 to be adjusted relative to the longitudinal axis 78 of the body 70.

The clip component 160 can permit the ferrules 82, 84 to be adjustable relative to the body 70. Further, the component 160 can also keep the ball-and-socket assemblies of the ferrules 82, 84 and the engagement structures 140, 142 intact by keeping the tip portion 126 of the ferrule 82 fully inserted into the engagement structure 140 or cone hole. Furthermore, the component 160 can also retains the ferrule 82, 84, when not adjusted by external force, in a desired position via friction between the ferrule skirt 132, 134 and the radial spring 180, 182. As such, the clip component 160 provides various advantageous features that can allow the assembly 30 to be engaged together or intact while allowing the ferrule 82, 84 to be adjustable and held or retained at a desired orientation.

As noted above, the assembly 30 can be configured such that ferrules 82, 84 can be maintained in a desired orientation after being adjusted to a proper alignment. The alignment can be maintained by frictional engagement (e.g., as discussed above, with the clip component 160 providing frictional engagement between the radial spring 180, 182, the ferrule skirt 132, 134 and the engagement structures 140, 142) and/or by a chemical bonding engagement. Thus, in some embodiments, a chemical bonding agent, such as a glue, adhesive, or hardenable material can be applied to the assembly 30 in order to fix the positions of the ferrules 82, 84 relative to the body 70.

For example, in some embodiments, the body 70 of the assembly 30 can comprise a bonding access hole 240, 242. The access hole 240, 242 can be in fluid communication with the engagement structure 140, 142 and at least a portion of the ferrules 82, 84 in order to allow a bonding agent to be applied to fix the orientation of the ferrules 82, 84 relative to the body 70.

The access hole 240, 242 can provide an adhesive injection point into the cone hole or engagement structure 140, 142 and around the ferrule 82, 84. Thus, after LO tip/tilt pointing adjustment is finalized, a bonding agent can be injected into the access hole 240, 242 in order to fix the pointing position of the ferrules 82, 84. In such embodiments, the application of a bonding agent to fix the position of the ferrules 82, 84 can thereafter eliminate the need for the clip component 160. However, the clip component 160 can also be left in place.

In order to adjust the alignment of the assembly 30, the ferrules 82, 84 can be rotated or pivoted within the engagement structures 140, 142. The ferrules 82, 84 of the assembly 30 can be aligned such that the LO light 94, 96 propagating therefrom can be reflected off of the mirror components 90, 92 onto the focal plane array 40 at a single, common spot with the received light 50. Thus, the ferrules 82, 84 can be adjusted such that respective spots of the LO light 94, 96 on the focal plane array 40 substantially overlap with each other and with a spot of the received light 50.

Figure 6:
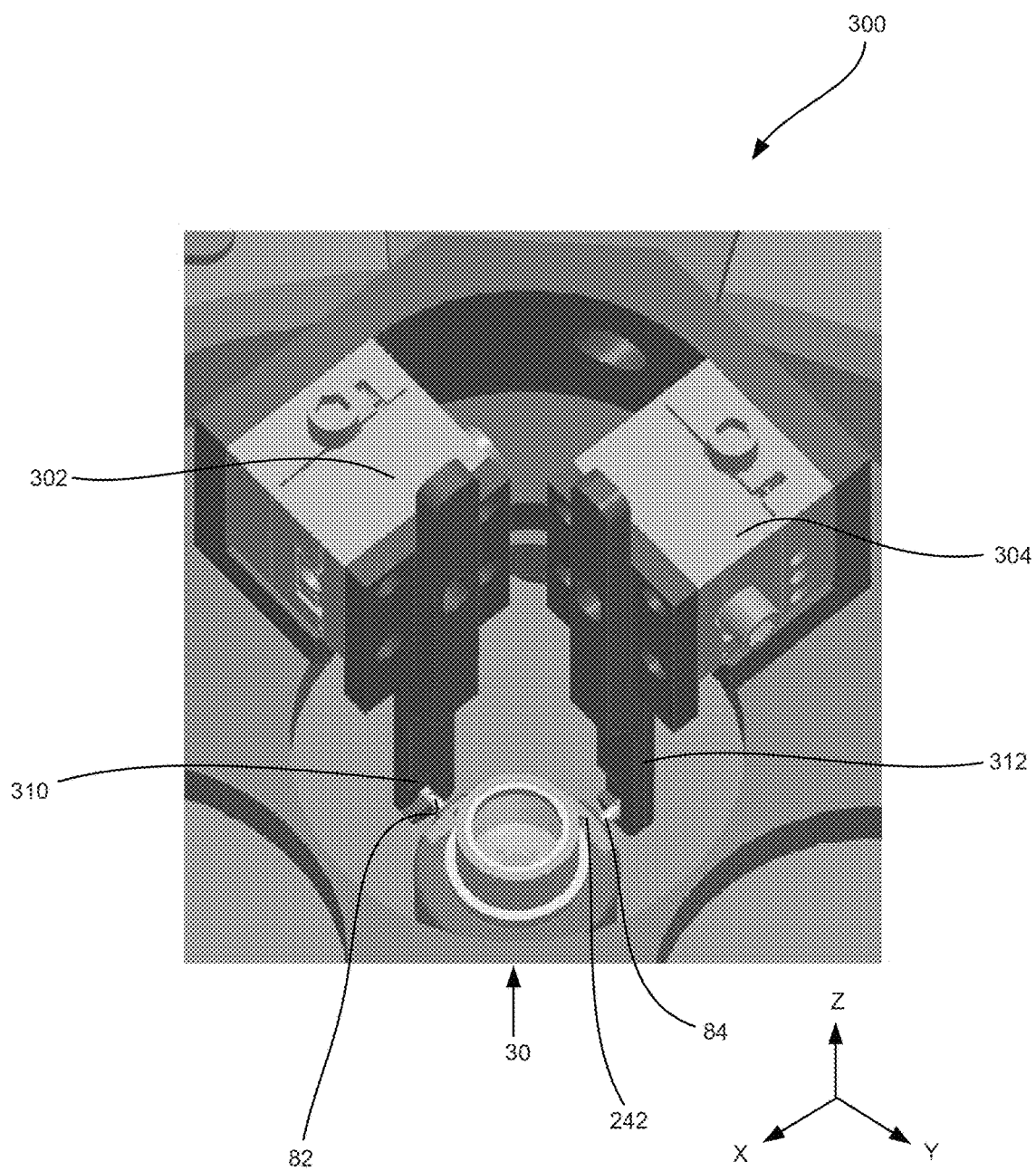
FIG. 6 is a view of an alignment device coupled to a launch assembly during alignment of ferrules, according to some embodiments.

Adjustment of the ferrules 82, 84 can be performed using an adjustment device. For example, FIG. 6 illustrates an adjustment device 300 the can be used to align the ferrules 82, 84 of the assembly 30. In some embodiments, the adjustment device 300 can serve to decouple the ferrule adjustment or pointing operation into two pointing direction adjustments that are perpendicular to each other.

For example, the adjustment device 300 can comprise first and second portions 302, 304 that can be moved independently of each other along X, Y, and Z axes. The first portion 302 can move along at least the X and Z axes, and the second portion 304 can be moved along at least the Y and Z axes. The first and second portions 302, 304 can each comprise an actuation arm 310, 312 that on one end, engages the proximal portion of the fiber ferrule (i.e., the portion opposite of the collimator exit). On the other end of the actuation arm 310, 312, the first and second portions 302, 304 can comprise a lead-screw-type X-Y translation stage. This X-Y translation stage can move the actuation arm 310, 312 in a translation plane perpendicular to the ferrule longitudinal or collimator axis. By moving the proximal portion of the ferrules 82, 84 in translation, the ball-and-socket arrangement results in a pointing change in the distal end or collimator exit of the ferrules 82, 84.

In some embodiments, the first and second portions 302, 304 can each be moved in a single direction at a time, thus allowing the user to precisely control and monitor the location the respective spot of the LO light 94, 96 on the focal plane array 40. Thus, the adjustment operation can be advantageously simplified compared to prior art techniques, allowing the user to adjust one direction at a time.

Advantageously, as illustrated in FIG. 6, the adjustment device 300 allows the ferrules 82, 84 to be adjusted on a side opposite of the LO light propagation (e.g., a proximal portion 122 of the ferrules 82, as shown in FIG. 5). Further, once the ferrules 82, 84 have been adjusted into a proper position, in some embodiments, a bonding agent can be applied in an area opposite the LO light propagation (e.g., at the ferrule skirt 132, 134 or access hole 240, 242). Thus, without removing the adjustment device 300, the user can obtain real time feedback from an image of the focal plane array 40 and fix the positions of the ferrules 82, 84 when properly adjusted. Such a system can facilitate LO pointing adjustment by the user and advantageously decrease alignment time compared to prior art methods and systems.

In some embodiments, the adjustment of the ferrules 82, 84 can be performed by hand or manually, the adjustment device 300 can advantageously allow the user to precisely control the tip/tilt alignment of the ferrules 82, 84. The adjustment device 300 can be external to the assembly 30 and removable after the adjustment is complete.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

There may be many other ways to implement the subject technology. Various functions and elements described herein may be partitioned differently from those shown without departing from the scope of the subject technology. Various modifications to these aspects will be readily apparent to those skilled in the art, and generic principles defined herein may be applied to other aspects. Thus, many changes and modifications may be made to the subject technology, by one having ordinary skill in the art, without departing from the scope of the subject technology.

It is understood that the specific order or hierarchy of steps in the processes disclosed is an illustration of exemplifying approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A compact LIDAR pointing assembly, comprising:
    a body comprising an optical axis and an engagement socket;
    a ferrule having a round distal tip portion and an annular portion, the tip portion being in contact with the engagement socket; and
    a clip component extending around a perimeter of the body, the clip component comprising a spring component contacting the annular portion to urge the tip portion into contact with the engagement socket, the spring component being deflectable to permit pivoting movement of the ferrule with respect to the socket;
    wherein the ferrule is pivotable such that light emanating from the ferrule can be aligned with received light propagating along the optical axis.

2. The assembly of claim 1, wherein the spring component comprises a first end coupled to the clip component and a free portion that is deflectable relative to the first end thereof.

3. The assembly of claim 2, wherein the spring component comprises a second end, opposite the first end, coupled to the clip component, the free portion being interposed between the first and second ends.

4. The assembly of claim 1, wherein the annular portion comprises a proximal section and a distal section interposed between the tip portion and the proximal section, the clip component being in contact with the proximal section to urge the tip portion into contact with the engagement socket.

5. The assembly of claim 4, wherein the distal section is spaced apart from a surface of the engagement socket such that only the tip portion of the ferrule is in contact with the engagement socket.

* * * * *